(No Model.)
A. W. JONES.
FRICTION CLUTCH.
No. 427,085. Patented May 6, 1890.
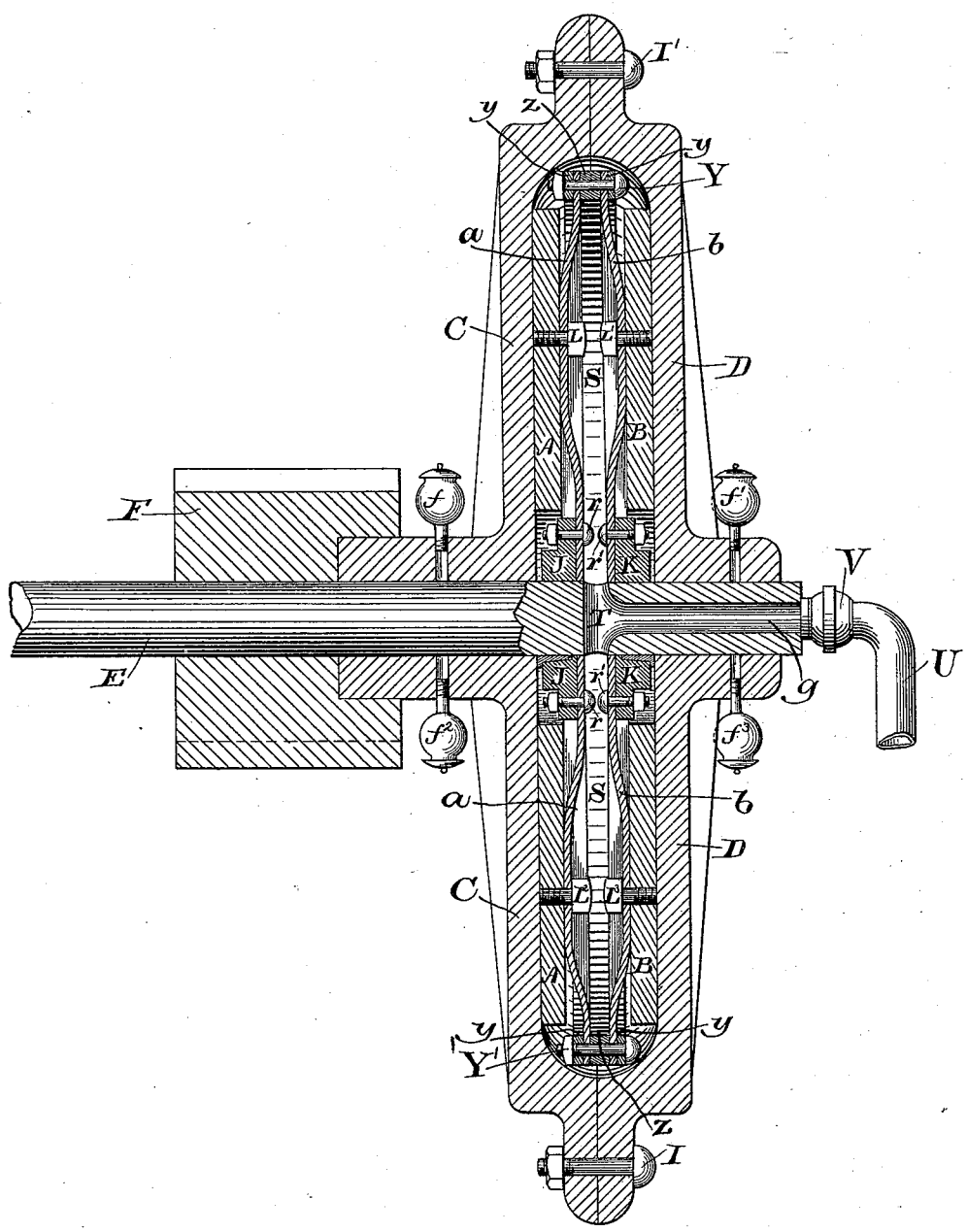
WITNESSES:
INVENTOR:
Arthur W. Jones
by Bentley & Knight
ATTYS.

UNITED STATES PATENT OFFICE.

ARTHUR W. JONES, OF BOSTON, MASSACHUSETTS.

FRICTION-CLUTCH.

SPECIFICATION forming part of Letters Patent No. 427,085, dated May 6, 1890.

Application filed October 26, 1889. Serial No. 328,357. (No model.)

*To all whom it may concern:*

Be it known that I, ARTHUR W. JONES, a resident of Boston, in the county of Suffolk and State of Massachusetts, have invented a new and useful Improvement in Friction-Clutches; and I do hereby declare the following to be a full, clear, and exact description thereof.

My invention relates to an improvement in a friction-clutch; and it consists of a device by which there is no relative motion at any joints which are under the pressure of oil or other liquid.

I will now describe my invention so that others skilled in the art may manufacture and use the same, reference being had to the accompanying drawing, forming a part of this specification, which is a sectional view of my invention.

Like letters refer to like parts throughout.

In the drawing, E represents the driving-shaft by which the power is applied, and F the gear or pulley wheel from which the power is taken. Loose upon the shaft and free to revolve independently is the casing C D, the hub of which is suitably connected to the wheel F. This casing is made in two parts, which are fastened together at I I', &c., about the circumference. The journals of the casing are oiled at $f f' f^2 f^3$, &c. The oil-cups are automatic in their action, centrifugal force throwing the oil away from the journals when the casing is revolving with the shaft. Inside this casing and keyed fast to the shaft, and otherwise secured so as to insure against rotary and longitudinal motion on the same, are the two hubs marked in the drawing, respectively, J and K. Firmly secured to these hubs at $r r'$, &c., are the annular elastic sheet-metal plates $a$ and $b$, as shown, which same plates are connected together by bolts at several points in their circumference, as shown at Y Y'. The plates are further re-enforced against leakage by the metal rings $y y$, clamped against the outside of the plates by the bolts Y Y', as shown. The annular elastic plates form an extensible fluid-tight casing, which constitutes the inner member of the clutch. An intermediate ring $z$ is shown clamped between the disks at their peripheries, the object of these rings $y y z$ being to hold the edges of the flexible disks firmly together at the places between the bolts, and thus prevent leakage of oil.

The oil or other fluid to be used in the operation of the clutch is admitted through passages $g$ T in the shaft, the said passages communicating through a coupling V and pipe U with a pump or other source of fluid-pressure.

Attached to the annular elastic plate $a$ by bolts L L², &c., is the annular plate A, and secured to the annular elastic plate $b$ by bolts L' L³, &c., is the annular plate B. These disks A and B form the inner friction surfaces or members of the clutch.

The drawing shows the clutch in action with the annular elastic plates distended, and thereby forcing the outer surfaces of A and B in contact with the inner surfaces of the casing C and D, and causing severe friction between them.

The method of employing this clutch is as follows: By means of a pump or other suitable device oil or other fluid is forced through the passages $g$ T in the shaft and thence into the oil-well of the clutch at S. The pressure of the oil from the pump presses the elastic plates $a$ and $b$ apart, thereby causing severe friction between A and C and B and D, as shown in the drawing. The outer casing gradually and quietly takes up the motion of the inner system and communicates it to the pulley or gear wheel F. On releasing the pressure from the pump the annular sheet-metal plates spring back to their original position, forcing the oil out of the tubes shown and relieving all friction in the clutch.

Although I have described annular sheet-metal plates $a$ and $b$, I do not wish to confine myself to metal, as other material—such as paper or fiber or the like—might be found to answer the purpose and give satisfaction. Neither do I wish to confine myself to the particular arrangement of annular elastic plates described. The annular plates A and B may form one and the same piece of metal as the hubs J and K, respectively, and be connected together by the annular sheet-metal disks at their outer circumference, while close to the hub the metal ring may be turned thin, so as to give the necessary elasticity.

In another application, Serial No. 328,980, filed November 1, 1889, I have claimed the modification just described, and I therefore do not claim the same in this case. Other matters shown and described in this case, but not claimed herein, are reserved for my other application.

Having thus described my invention, what I claim as new, and desire to secure by Letters Patent, is—

1. In a fluid friction-clutch, the combination of an extensible inner member secured upon the shaft and forming a fluid-tight casing having internal communication with a source of fluid-pressure, with an outer casing having free bearings upon the shaft, against the inner sides of which the said extensible inner member is adapted to bear when expanded, substantially as described.

2. The combination of the shaft with flexible disks secured thereto and forming a close fluid-tight casing communicating through the shaft with a source of fluid-pressure, friction-plates attached to said disks, and an outer rigid casing having free bearings on the shaft, against the inner walls of which outer casing the said friction-plates may be made to bear by the fluid-pressure.

3. The combination, in a fluid-pressure clutch, of an extensible fluid-tight casing fastened at its center to a shaft and inclosed in a rigid casing free to move on the shaft and friction plates or disks secured to the outside of the extensible casing and adapted to bear against the inside walls of the inclosing-case.

4. The combination, in a fluid-pressure clutch, of an outer casing free to move on a shaft and an interior extensible fluid-tight casing having rigid friction-plates on its opposite sides, adapted to bear against the inner walls of the outer casing and flexible both at its periphery and hub, substantially as set forth.

5. In a fluid-pressure friction-clutch, the combination of the outer casing and the interior extensible casing consisting of two disks secured at their central portions to hubs, which are in turn secured to the shaft, the said disks being connected with an oil-tight joint at their peripheries.

In testimony whereof I, the said ARTHUR W. JONES, have hereunto set my hand.

ARTHUR W. JONES.

Witnesses:
M. C. WARNER,
J. N. COOKE.